United States Patent [19]

Unsworth et al.

[11] Patent Number: 4,496,016

[45] Date of Patent: Jan. 29, 1985

[54] LAND VEHICLES

[76] Inventors: Derek Unsworth, 4 Farmside, Borris Park, Wrexham, Clwd, Wales; Edward J. Diggs, 8 Lime Tree Dr., Frandon, Cheshire, England

[21] Appl. No.: 440,621

[22] Filed: Nov. 10, 1982

[30] Foreign Application Priority Data

Oct. 15, 1982 [GB] United Kingdom ............... 8229544
Oct. 15, 1982 [GB] United Kingdom ............... 8134024

[51] Int. Cl.³ .................... B60K 17/28; B60K 25/08
[52] U.S. Cl. .................... 180/53.6; 62/242; 74/13; 105/27; 180/53.1; 180/65.3; 301/124 H
[58] Field of Search ............... 180/53.1, 53.4, 53.8, 180/53.62, 53.6, 165, 65.5, 65.3; 105/27; 62/241, 242; 301/124 H, 126; 74/13

[56] References Cited

U.S. PATENT DOCUMENTS 1,683,307  9/1928  Ryan et al. .................... 180/53.6
3,049,928  8/1982  Boughner .................... 74/13

Primary Examiner—Richard A. Bertsch
Attorney, Agent, or Firm—Bernard, Rothwell & Brown

[57] ABSTRACT

A wheeled land vehicle in which at least one free-running ground-engaging wheel has power take-off means connected thereto for providing power in or on the said vehicle, such power take-off means including an input shaft coaxial with and drivingly connected to said ground-engaging wheel and extending inwardly therefrom through a non-rotary hollow axle shaft, and power take-off mechanism drivingly connected to the said input shaft and mounted in cantilever fashion on an inboard termination of said axle shaft.

12 Claims, 6 Drawing Figures

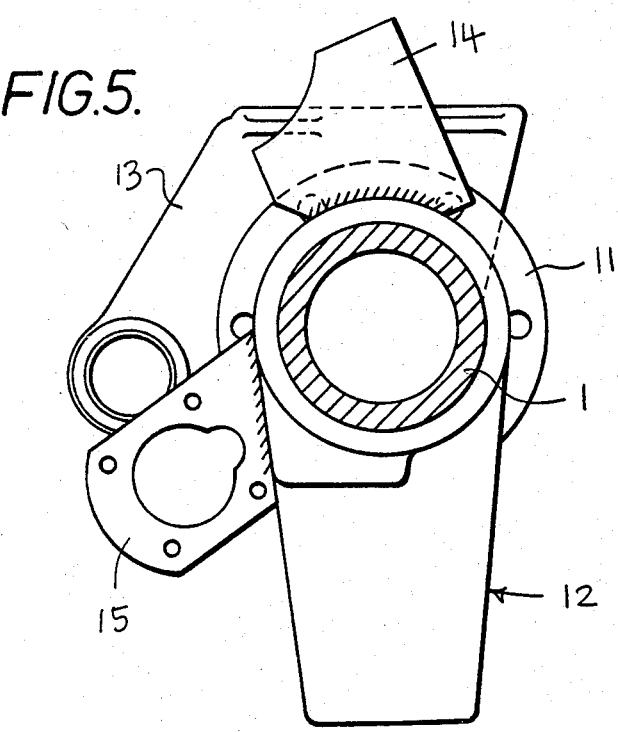
FIG.5.
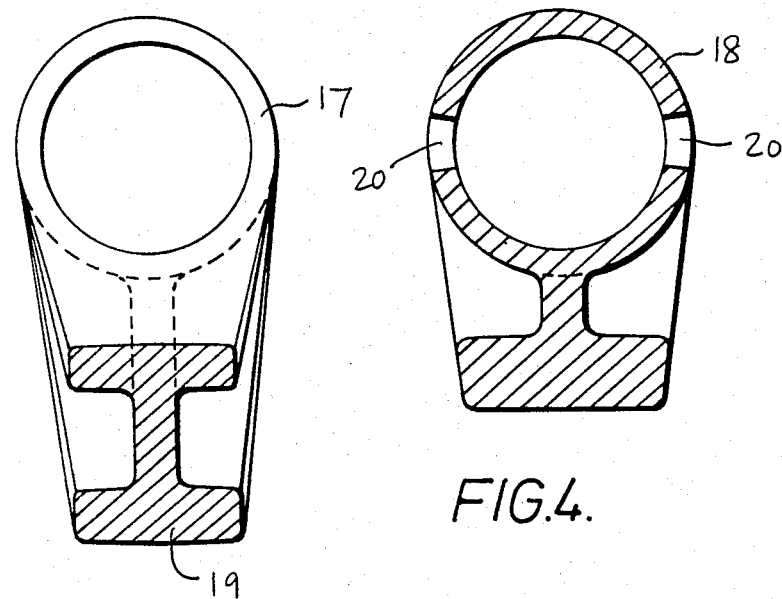
FIG.3.
FIG.4.

LAND VEHICLES

This invention relates to the provision of power in wheeled land vehicles, particularly but not exclusively in unpowered, e.g. trailer type, vehicles. In such a vehicle power may be required for all manner of purposes, for example for running heating, cooling or air-conditioning equipment or for driving other machinery to be used in or in association with the vehicle either when it is stationary or when it is moving, or for charging batteries carried by the vehicle. One of many possible examples is a refrigerated trailer vehicle used to transport bulk supplies of ice-cream or frozen foods, in which power is required for running the refrigeration system.

Leaving aside the use of electric mains power which is of course only available when the vehicle is stationary at a suitable location, up to now the required power for an unpowered vehicle has been provided by a prime mover on another vehicle, for example the engine of a powered vehicle which pulls the unpowered vehicle if it is a trailer. This has essentially involved the provision of power transmission connections between the two vehicles, with obvious and well known disadvantages, such as tedious and time-consuming operations in making and unmaking the connections, and the inconvenient and sometimes dangerous consequences that can result from an accidental breakage in such a connection or an omission to make or unmake it at the appropriate time.

Our U.S.A. patent application Ser. No. 372,745 relates to a wheeled land vehicle in which at least one free-running ground-engaging wheel has power take-off means connected thereto for providing power in or on the said vehicle. In an embodiment of the invention described in that patent application the said power take-off means includes an input shaft coaxial with and drivingly connected to said ground-engaging wheel and extending inwardly therefrom through a non-rotary hollow axle shaft which mounts the wheel at its outer end. To enable power to be transmitted laterally out of the line of the axle shaft, power take-off mechanism in the form of a gear-box connected to the said input shaft is incorporated in the axle shaft by splitting the latter transversely and mounting the gear-box between flanges on the coaxially opposed ends of the shaft portions. This arrangement however has the disadvantage that the axle shaft structure is weakened by the insertion of the gear-box or other power take-off mechanism therein, and furthermore such mechanism is not readily removable for servicing or replacement.

Viewed from one aspect the present invention provides a wheeled land vehicle in which at least one free-running ground-engaging wheel has power take-off means connected thereto for providing power in or on the said vehicle, such power take-off means including an input shaft coaxial with and drivingly connected to said ground-engaging wheel and extending inwardly therefrom through a non-rotary hollow axle shaft, and power take-off mechanism drivingly connected to the said input shaft and mounted in cantilever fashion on an inboard termination of said axle shaft.

Viewed from another aspect the invention provides an axle structure for a free-running ground-engaging wheel of a vehicle, including a power take-off input shaft extending coaxially through a non-rotary hollow axle shaft and arranged to be drivingly connected to the wheel at its outer end and to a power take-off mechanism at its inner end, and means for mounting such a power take-off mechanism in cantilever fashion on an inboard termination of said axle shaft.

Mounting the said power take-off mechanism in such cantilever fashion greatly simplifies its removal when required, as compared with the previous arrangement described above, and furthermore enables the vehicle to be used, or at least moved, without such mechanism in place if desired.

In one form of the invention the axle structure could terminate entirely where the axle shaft mounts the said power take-off mechanism, a separate axle structure then mounting the opposite wheel on the other side of the vehicle. However in a preferred form of the invention in which the axle structure extends right across the vehicle and mounts an opposite wheel at its other end, as is indeed conventional in commercial vehicles, a second non-rotary hollow axle shaft for an opposite wheel is coaxial with the first-mentioned axle shaft and is rigidly connected thereto by a bridge, part of which bridge is laterally displaced from the axle shaft axis to provide space for the said power take-off mechanism, the two axle shafts and the bridge constituting a rigid axle structure.

It will be appreciated that with such arrangements, whether or not the axle structure extends right across the vehicle, the loss of axle shaft strength inherent in the previous proposal described above is avoided.

It will be understood from the above description of alternative forms of the invention that references herein to the power take-off mechanism being mounted on an inboard termination of its associated axle shaft should not be interpreted as meaning that the axle structure as a whole necessarily terminates at that mounting.

Preferably a mounting flange for the power take-off mechanism is provided on the said inboard termination of the axle shaft, to securely mount such mechanism in a square and central location relative to the axle shaft for the introduction of the said input shaft thereto, and to enable removal and replacement of the mechanism in a speedy and simple manner.

Where the axle structure extends beyond the power take-off mechanism and incorporates a bridge as aforesaid, the bridge may be fabricated, e.g. as an intermediate bridging shaft rigidly secured to the main axle shafts by suitable plates, or as a U-shaped casting welded directly to such shafts, or alternatively the whole shaft structure including the bridge may be formed as a one-piece casting. In a preferred embodiment the said bridge is a one-piece casting having oppositely facing hollow end portions in the form of tubular sleeves which receive the respective axle shafts therein as an interference fit and are welded thereto.

The bridge may be arranged to extend laterally out of the principal line of the axle structure in any direction depending on circumstances, for example downwardly, upwardly, or forwardly or rearwardly in a horizontal direction.

The power take-off mechanism may take any of a number of forms. A gear-box structure has already been mentioned, which may operate alone to transmit mechanical power to one or more systems in the vehicle or may if desired be formed as a unit with for example a hydraulic pump driven through the gear-box to power a hydraulic motor at a different location. Alternatively the power take-off mechanism could comprise for example a hydraulic pump driven directly by the said input shaft, or an electric alternator similarly driven.

When a vehicle according to the invention is referred to as being "unpowered" it should be clearly understood that this term refers only to motive power and it is thus not intended to exclude vehicles which are provided additionally with some other power source which is not used to provide motive power. Thus the invention may provide an unpowered vehicle which its own self-contained source of power, driven by the rotation of one or more of its wheels in contact with the ground, and thus available whenever the vehicle is moving at a sufficient speed to provide useful power, and indeed at other times if the power is used to charge power storage means such as batteries. Alternatively the invention may provide a powered vehicle with an additional source of power taken from a free-running, i.e. unpowered, wheel thereof.

An embodiment of the invention will now be described by way of example and with reference to the accompanying drawings, in which:

FIGS. 3 to 5 are cross-sections on lines III—III, IV—IV and V—V of FIG. 2 respectively.

Figure 1:
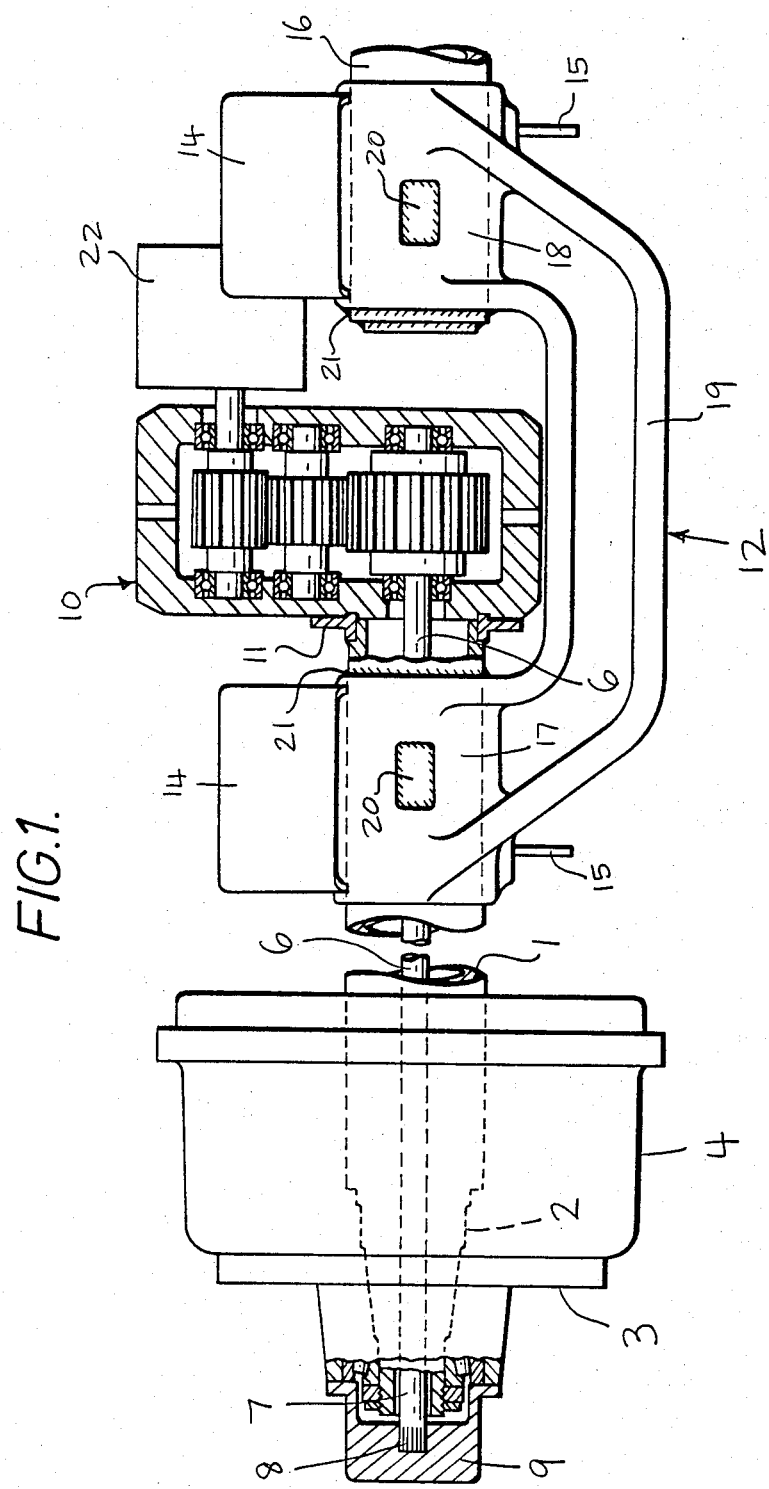
FIG. 1 is a view in elevation and partly in section of part of an axle structure incorporating power take-off mechanism according to the invention.
Figure 2:
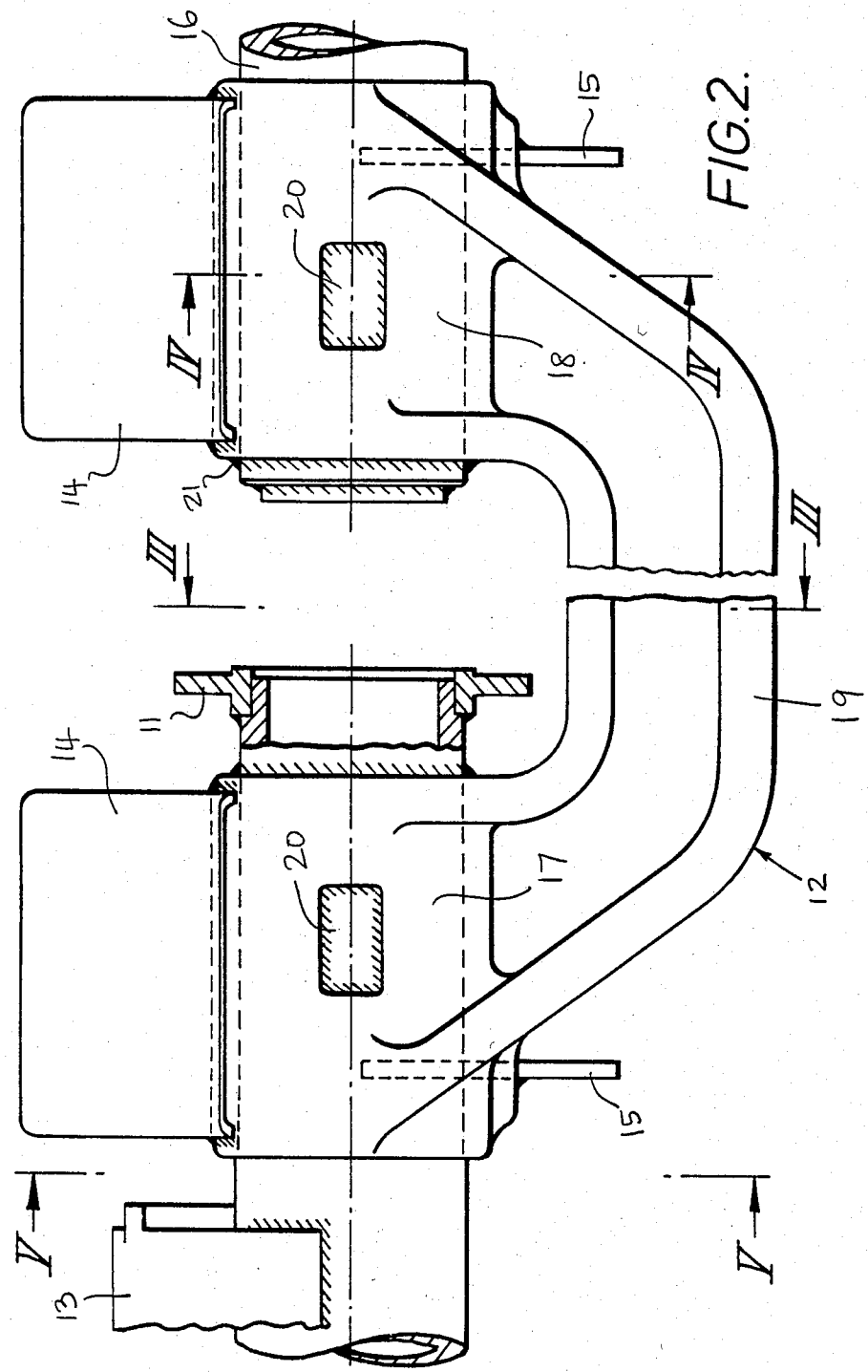
FIG. 2 is a similar view, but on a larger scale, of the central part of the structure of FIG. 1 but with the power take-off mechanism removed.
Figure 6:
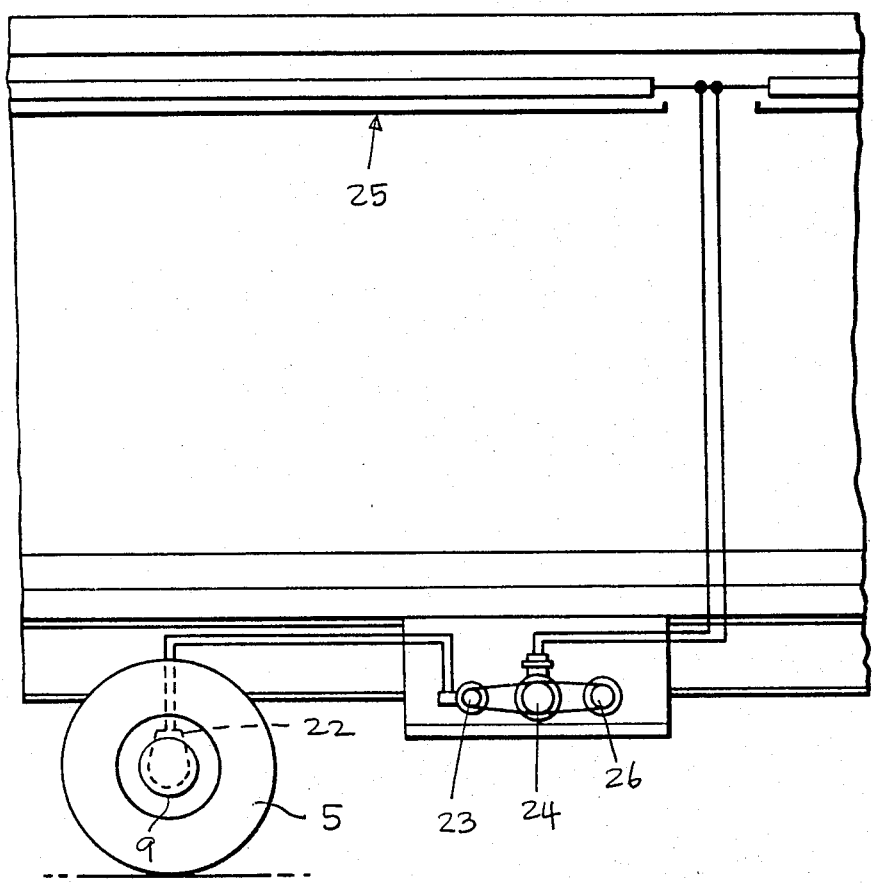
FIG. 6 is a diagram illustrating one way of using the power from the power take-off mechanism in a refrigerated vehicle.

Referring to the drawings, there is shown an axle structure comprising a hollow cylindrical non-rotary axle shaft 1, and a non-rotary solid stub axle 2 which carries brake shoes and rotatably mounts a hub 3 carrying a brake drum 4 and a free-running ground engaging wheel 5 (FIG. 6). The stub axle 2 is bored out axially to receive a power take-off input shaft 6 which at its outer end 7 is connected via splines 8 to a splined recess in a cap 9 bolted to the end face of the hub 3 and thus drivable in rotation by wheel 5 mounted on the hub and in contact with the ground.

The input shaft 6 extends through the bored stub axle 2 and hollow axle shaft 1 into a power take-off mechanism in the form of a gearbox 10 which is mounted in cantilever fashion from a flange 11 on an inboard termination of the axle shaft 1. The axle structure extends right across the vehicle and such structure is made rigid by a bridge 12. This arrangement facilitates removal and replacement of the mechanism 10 without any weakening of the axle shaft structure.

The axle structure carries spring seats 13 for connection of the axle to a spring suspension of a vehicle, brake operating air cylinder mounting brackets 14, and brake operating camshaft support brackets 15. A second axle shaft 16 with stub axle, hub and drum (not shown) extends from the bridge 12 away from axle shaft 1 to carry a second free-running ground-engaging wheel.

The bridge 12 is a steel casting having coaxial sleeve portions 17, 18 integral with an I-section connecting portion 19 which is offset from the principal axis of the axle structure to provide space for the gearbox 10. The sleeve portions 17, 18 each have diametrically opposed openings 20 which extend along and span the neutral axis of the axle shafts 1, 16 when loaded.

The axle shafts 1 and 16 are received within, and extend beyond, the sleeve portions 17 and 18 respectively with an interference fit and are secured thereto by welding around their peripheries within the bridged portion of the structure, as shown at 21. The axle shafts are additionally secured to the respective sleeve portions by welding around the openings 20. The length of each sleeve portion 17, 18 is of the order of one and a half times the diameter of the axle shafts 1, 16 which are received within them.

FIG. 5 illustrates the location of spring seat 13, air cylinder bracket 14 and camshaft support bracket 15 relative to bridge 12. FIGS. 3 and 4 illustrate the cross-sectional shape of bridge 12 in more detail, with the axle shafts omitted.

The gearbox 10 drives a hydraulic pump 22 connected as a unit therewith and arranged to supply hydraulic power, for example to drive a compressor of a refrigeration system. As shown by way of example in FIG. 6, the pump may be employed to drive a hydraulic motor 23 which itself drives a compressor 24 of a refrigeration system 25 of a refrigerated vehicle. Indicated at 26 in FIG. 6 is an ancillary electric motor which drives the compressor when the vehicle is stationary, as is already common practice.

Some of the many alternative uses of the power from the input shaft 6, mentioned purely by way of example, are to drive an alternator, to drive a pneumatic pump, or to provide a mechanical drive via belts, chains or a flexible drive.

As an example of the power available, at a vehicle speed of 60 mph the wheels would typically turn at about 750 rpm which, using a 2:1 gear ratio in the gearbox 10, provides an output shaft speed of 1500 rpm. Obviously the vehicle speed will continually vary, but if any particular use of the available power requires a substantially regular input then some form of variable transmission e.g. of the cone and belt type, could be incorporated.

Obviously more than one power take-off system in accordance with the invention could be incorporated in a single vehicle, driven by different wheels on the same and/or different axles. It should be mentioned that it is of course essential for the apparatus of the invention to be so arranged that the vehicle may be moved rearwardly as well as forwardly without any adverse effects on the various mechanisms described herein.

We claim:

1. In a wheeled land vehicle having a non-rotary hollow axle shaft, a free-running ground-engaging wheel on one end of said shaft, a power take-off input shaft extending coaxially through said axle shaft, a power take-off mechanism, and means drivingly connecting the said power take-off shaft to the said wheel at the outer end of the shaft and to the said power take-off mechanism at its inner end, the improvement comprising, in combination: the axle shaft being divided in its length to provide a space for locating the said power take-off mechanism on the axle shaft axis, a bridge rigidly connecting the two parts of the axle shaft and having a part thereof laterally displaced from the axle shaft axis to provide said space for the said power take-off mechanism, said mechanism being mounted in said space in cantilever fashion on the inboard termination of the outer one of said axle shaft parts.

2. A vehicle as claimed in claim 1, wherein the said bridge has oppositely facing hollow end portions which receive the respective axle shafts therein.

3. A vehicle as claimed in claim 2, wherein the said axle shafts make an interference fit in the said bridge end portions and are welded thereto.

4. A vehicle as claimed in claim 3, wherein each said bridge end portion comprises a tubular sleeve having openings between its ends which extend along and span the neutral axis of its associated axle shaft, the sleeve and axle shaft being welded together around said openings and around the inner end of the sleeve.

5. Vehicle as claimed in claim 1, wherein the said bridge is a one-piece casting.

6. A vehicle as claimed in claim 1 which is a refrigerated vehicle whose refrigeration system is powered by said power take-off mechanism.

7. A vehicle as claimed in claim 6, which is an unpowered trailer type vehicle.

8. In an axle structure of a vehicle, including a non-rotary hollow axle shaft adapted to mount a free-running ground-engaging wheel on one end of said shaft, a power take-off input shaft extending coaxially through said axle shaft, a power take-off mechanism, means adapted to drivingly connect the said power take-off shaft to such a wheel at the outer end of the shaft, and means drivingly connecting the said power take-off shaft to the said power take-off mechanism at the inner end of the shaft, the improvement comprising, in combination: the axle shaft being divided in its length to provide a space for locating the said power take-off mechanism on the axle shaft axis, a bridge rigidly connecting the two parts of the axle shaft and having a part thereof laterally displaced from the axle shaft axis to provide said space for the said power take-off mechanism, said mechanism being mounted in said space in cantilever fashion on the inboard termination of the outer one of said axle shaft parts.

9. An axle structure as claimed in claim 8, wherein the said bridge has oppositely facing hollow end portions which receive the respective axle shafts therein.

10. An axle structure as claimed in claim 9, wherein the said axle shafts make an interference fit in the said bridge end portions and are welded thereto.

11. An axle structure as claimed in claim 10, wherein each of said bridge end portions comprises a tubular sleeve having openings between its ends which extend along and span the neutral axis of its associated axle shaft, the sleeve and axle shaft being welded together around said openings and around the inner end of the sleeve.

12. An axle structure as claimed in claim 8, wherein the said bridge is a one-piece casting.

* * * * *